United States Patent [19]

Satoh et al.

[11] Patent Number: 6,021,390
[45] Date of Patent: Feb. 1, 2000

[54] INFORMATION SELLING METHOD AND INFORMATION SELLING SYSTEM

[75] Inventors: Kazuo Satoh; Masayuki Ishizaki; Yoshimasa Kadooka, all of Kawasaki, Japan

[73] Assignee: Fujitsu Limited, Kanagawa, Japan

[21] Appl. No.: 08/940,272

[22] Filed: Sep. 29, 1997

Related U.S. Application Data

[63] Continuation of application No. 08/504,692, Jul. 20, 1995, abandoned, which is a continuation of application No. 08/101,986, Aug. 4, 1993, abandoned.

[51] Int. Cl.[7] ............................. G06F 17/60; G06F 17/00
[52] U.S. Cl. .................. 705/1; 364/479.01; 364/479.04; 705/28
[58] Field of Search ................................. 705/1, 21, 26, 705/28; 235/381; 364/479.04, 479.06, 479.01, 479.02, 479.03

[56] References Cited

U.S. PATENT DOCUMENTS

| | | | |
|---|---|---|---|
| 4,107,784 | 8/1978 | Van Bemmelen | 364/401 |
| 4,412,292 | 10/1983 | Sedam et al. | 364/479.11 |
| 4,502,120 | 2/1985 | Ohnishi et al. | 705/21 |
| 4,594,664 | 6/1986 | Hashimoto | 705/21 |
| 4,600,988 | 7/1986 | Tendulkar et al. | 364/200 |
| 4,674,055 | 6/1987 | Ogaki et al. | 364/479 |
| 4,677,565 | 6/1987 | Ogaki et al. | 364/479 |
| 4,692,862 | 9/1987 | Cousin et al. | 395/325 |
| 4,787,050 | 11/1988 | Suzuki | 364/479 |
| 4,866,661 | 9/1989 | De Prins | 364/401 |
| 4,935,863 | 6/1990 | Calvas et al. | 364/138 |
| 4,941,084 | 7/1990 | Terada et al. | 364/200 |
| 5,062,147 | 10/1991 | Pickett et al. | 364/401 |
| 5,065,343 | 11/1991 | Inoue | 395/162 |
| 5,267,171 | 11/1993 | Suzuki et al. | 364/479 |
| 5,546,316 | 8/1996 | Buckley et al. | 364/479.03 |

FOREIGN PATENT DOCUMENTS 63-199388 12/1988 Japan .
1-105656 4/1989 Japan .

OTHER PUBLICATIONS

Everest, Gordon C., "Database Management", McGraw–Hill Book Company, pp. 745–746, ©1986.
Katzan, Harry Jr., "Distributed Information Systems", Petrocelli Books, Inc. pp. 101–110 and 156–166, 1979.

Primary Examiner—Stephen R. Tkacs
Assistant Examiner—Alexander Kalinowski
Attorney, Agent, or Firm—Helfgott & Karas, P.C.

[57] ABSTRACT

An information center transmits information as the object of sales to each information vending machine in advance through a communication line and stores it in the information storage portion of each information vending machine. Each information vending machine stores correspondence list which specifies the correspondence of each information vending machine with the information as the object of sales which is stored therein. When the information vending machine operated does not store the information requested by a purchaser in the information storage portion thereof, the information vending machine refers to the correspondence list, finds other information vending machine which stores the requested information, receives the information from the other information vending machine through the communication line and copies the information on a recording medium so as to sell the information. It is thus possible to increase the number of kinds of information sold by each information vending machines without increasing the capacity of the storage unit thereof.

5 Claims, 15 Drawing Sheets

INFORMATION SELLING METHOD AND INFORMATION SELLING SYSTEM

This is a continuation of application Ser. No. 08/504,692, filed Jul. 20, 1995, now abandoned, which is a continuation of application Ser. No. 08/101,986, filed Aug. 4, 1993, now abandoned.

BACKGROUND OF THE INVENTION

1. Field of the Invention

The present invention relates to an information selling method and an information selling system and, more particularly, to an information selling method and an information selling system for selling information as the object of sales from an information vending machine by transmitting the information from an information center to the information vending machine through a communication line and copying the information which is requested by a purchaser on a recording medium (storage medium).

2. Description of the Related Art

An information selling system has been proposed (e.g., Japanese Patent Laid-Open No. 234296/1990) in which information such as an electronic newspaper and a magazine is sold by transmitting the information from an information center to the information vending machines provided in predetermined areas through communication lines and copying the information on a recording medium such as a memory card and a floppy disk.

FIG. 16 shows the structure of such an information selling system. The reference numeral 1 represents an information center for collecting information and transmitting it to information vending machines, 2 a network NW such as a public network, a videotext network and an ISDN network, 3a to 3n information vending machines provided in predetermined places, 4 a recording medium such as a memory card and a floppy disk, and 5 a terminal equipment owned by a purchaser. When a purchaser specifies the information to be bought through the operating portion OP of a predetermined vending machine (3a to 3n) and pays the necessary price in cash, by a prepaid card or the like, the vending machine copies the specified information on the recording medium 4 and discharges the recording medium 4. The purchaser inserts the recording medium 4 into his own terminal equipment 5 and executes the predetermined operation so as to display the information obtained on a display portion 5a.

In such an information selling system, two methods have been proposed as a method of transmitting information from the information center 1 to the information vending machines 3a to 3n and selling the information. (1) In a first method, the information as the object of sales is transmitted from the information center 1 to the vending machines 3a to 3n and stored therein in advance, and the information is sold without the need for communication with the information center 1. (2) In a second method, the information as the object of sales is not stored in the information vending machines 3a to 3n in advance but transmitted from the information center 1 to the vending machine (3a to 3n) in response to the request from the vending machine (3a to 3n) so as to sell the information.

FIG. 17 explains the first information selling method. When the information center 1 is ready to transmit the information as the object of sales to the information vending machines 3a to 3n, the information center 1 first transmits the information to the information vending machine 3a through the communication line 2 and a storage unit MEM stores the information. The information center 1 then transmits the same information to the information vending machine 3b through the communication line 2 and the storage unit MEM of thereof stores the information. In the same way, the information center 1 transmits the same information sequentially to each of the vending machines 3c, 3d . . . 3n and each storage unit MEM stores the information. When the purchaser specifies the information to be bought from the a predetermined information vending machine, e.g., 3b, the information is read from the storage unit MEM, copied on the recording medium 4 and sold.

FIG. 18 explains the second information selling method. Information is collectively stored in the information center 1, and when the predetermined vending machine, e.g., 3b (among 3a to 3n) requests information, the information center 1 transmits the requested information to the information vending machine 3b through the communication line 2. The information vending machine 3b receives the information, copies it on the recording medium 4 and sells it.

In the first method, since information as the object of sales is stored in the storage unit which is provided in each information vending machine, the amount of stored information is small due to the limitation of the capacity of the storage unit so that the purchaser cannot have a wide variety of selections of information.

In addition, in the first method, since the amount of stored information is small, there is a high possibility that the information requested by a purchaser is not stored in the vending machine operated. As a result, the sales of information fall off.

In the first method, when part of information becomes out-of-date, it is necessary to replace the information stored in all of the vending machines, so that the maintenance takes much labor and time.

Furthermore, in the first method, if each information vending machine is provided with a storage unit having a large capacity in order to increase the amount of stored information, the price of an information vending machine rises. With respect to the maintenance, when the information vending machine is out of order, it is necessary to replace the storage unit, which leads to the rise in the maintenance cost.

Although the second method is free from these problems of the first method, since it is necessary to communicate with the information center every time information is sold, high communication expenses are required, which leads to the rise in the selling price.

SUMMARY OF THE INVENTION

Accordingly, it is an object of the present invention to eliminate the above-described problems in the related art and to provide an information selling method and an information selling system which are capable of increasing the number of kinds of information sold by vending machine without increasing the capacity of the storage unit of the vending machine.

It is another object of the present invention to provide an information selling method and an information selling system which are capable of increasing the number of kinds of information sold by a vending machine and, as a result, increasing the sales of information.

It is still another object of the present invention to provide in information selling method and an information selling system which are capable of prolonging the term of validity of stored information so as to reduce the labor and time for the maintenance.

It is a further object of the present invention to provide an information selling method and an information selling system which are capable of reducing the capacity of the storage unit of an information vending machine so as to hold down the price of the information vending machine to a low price.

It is a still further object of the present invention to provide an information selling method and an information selling system which obviate the necessity of communication with an information center every time information is sold, thereby holding down the selling price of information to a low price.

It is a still further object of the present invention to provide an information selling method and an information selling system which are capable of reducing the communication expenses required when information as the object of sales is transmitted from an information center to each information vending machine.

To achieve this aim, in a first aspect of the present invention, there is provided an information selling method comprising the steps of: retaining correspondence of each information vending machine with information as the object of sales which is stored therein, in every information vending machine; finding other information vending machine which stores the information requested by a purchaser with reference to the correspondence when the information vending machine operated does not store the information requested by the purchaser; and transferring the information from the other information vending machine to the vending machine operated so as to sell the information.

In a second aspect of the present invention, there is provided an information selling method comprising the steps of: providing a group of information vending machines which are composed of the main information vending machine and subordinate information vending machines; transmitting a correspondence list which specifies the correspondence of each information vending machine with the information as the object of sales which is stored therein from an information center to the main information vending machine; transmitting the information as the object of sales from the information center to the main information vending machine; and transferring the correspondence list and the information as the object of sales from the main information vending machine to a predetermined subordinate information vending machine.

In a third aspect of the present invention, there is provided an information selling system comprising information selling vending machines each of which includes: a storage portion for storing information to be sold; a storage portion for storing a correspondence list which specifies each information vending machine with the information as the object of sales which is stored therein; an operating portion for specifying the information to be bought by a purchaser; a control portion for finding other information vending machine which stores the information specified by the operating portion with reference to the correspondence list when the storage portion of the information vending machine operated does not store the information and requiring the other information vending machine to transfer the information thereto; and an information outputting portion for copying the information received from the other information vending machine or stored in the storage portion of the information vending machine operated on a recording medium.

In a fourth aspect of the present invention, there is provided an information selling system comprising: a group of information vending machines which are composed of the main information vending machine and subordinate information vending machines; a communication line for enabling the transmission of information between one information vending machine and another information vending machine therethrough; and an information center for transmitting a correspondence list which specifies the correspondence of each information vending machine with the information as the object of sales which is stored therein to the main information vending machine so that the main information vending machine transfers the correspondence list to the subordinate information vending machines, and transmitting the information to be sold by the group of information vending machines to the main information vending machine through the communication line; wherein the main information vending machine finds the information vending machine which is to store the received information with reference to the correspondence list and transfers the received information to the subordinate information vending machine.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (a) Principle of the Present Invention

Figure 1:
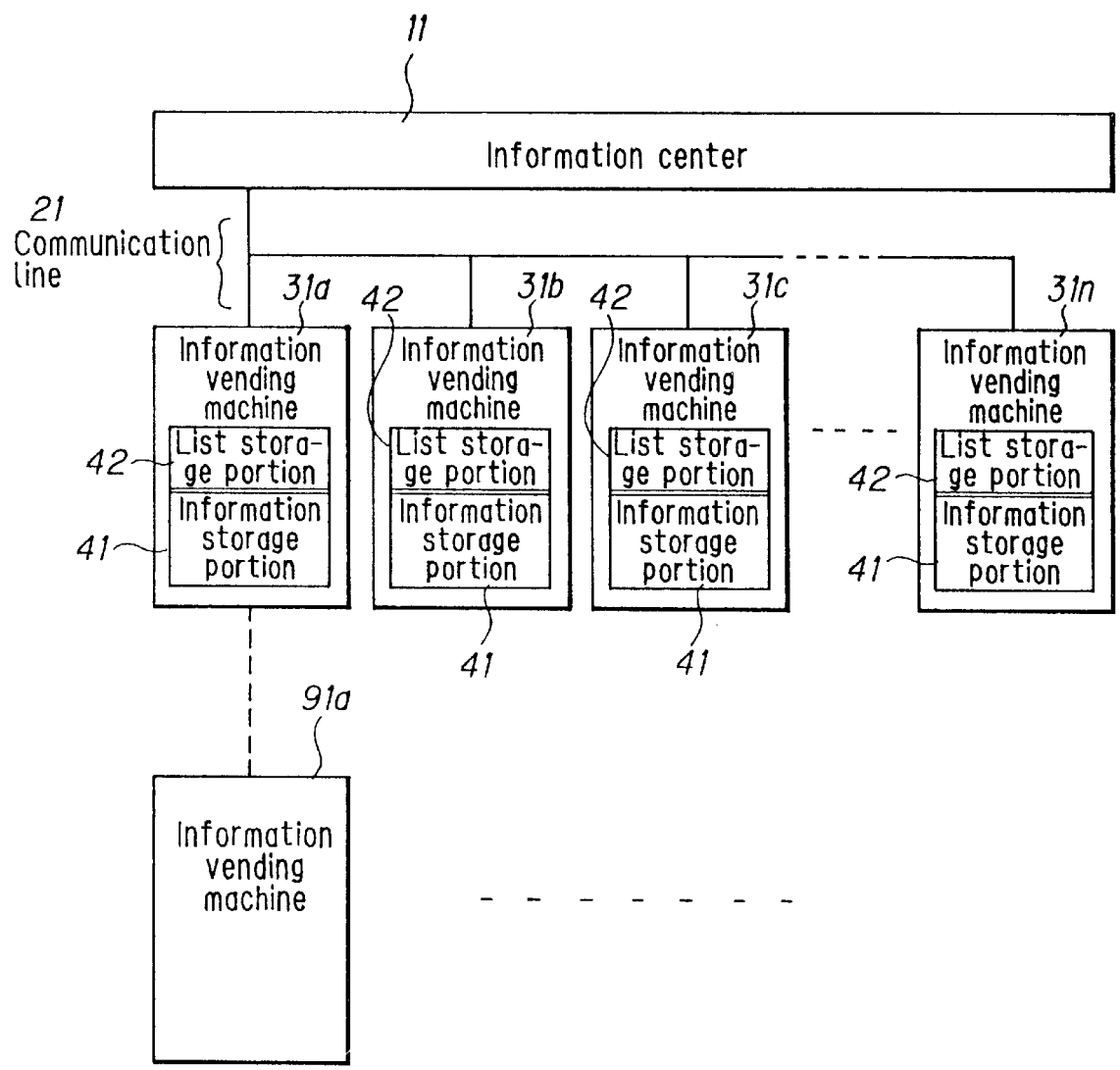
FIG. 1 is a schematic explanatory view of the principle of the present invention.

The reference numeral 11 represents an information center for transmitting information as the object of sales to information vending machines through a communication line, 21 a communication line, and 31a to 31n information vending machines for copying the information which is requested by a purchaser on a recording medium so as to sell the information. In each information vending machine, the reference numeral 41 denotes an information storage portion for storing information to be sold, and 42 a list storage portion for storing the correspondence list which specifies the correspondence of each information vending machine with the information as the object of sales which is stored therein.

The information center 11 transmits information as the object of sales which differs in the information vending machines to the information vending machines through the communication line 21 in advance, and the information is stored in the information storage portion 41 of each information vending machine. The list storage portion 42 of each information vending machine stores the correspondence list which specifies the correspondence of each information vending machine with the information as the object of sales which is stored therein. When the information storage portion 41 of the information vending machine operated by a purchaser so as ti buy information does not store the requested information, the information vending machine refers to the correspondence list, finds other information vending machine which stores the requested information, receives the information from the other information vending machine through the communication line 21 and copies the information on a recording medium so as to sell the information. In this way, since the information vending machine operated receives the information which is not stored therein from another information vending machine so as to sell the information, it is possible to increase the number of kinds of information sold by each information vending machines without increasing the capacity of the storage unit thereof. As a result, the sales of information are increased. Since the information vending machines store different kinds of information from each other, it is only the information vending machine which stores out-of-date information that is required to replace the information, which leads to the reduction of labor and time for the maintenance. In addition, since a storage unit having a small capacity suffices each information vending machine, it is possible to hold down the price of each information vending machine to a low price. Furthermore, since it is not necessary to communicate with the information center every time information is sold, it is possible to hold down the selling price of information to a low price.

A plurality of information vending machines 31a to 31n consist a group, the information vending machine 31a being the main information vending machine and the other information vending machines 31b to 31n being subordinate information vending machines. The main information vending machines is privy to all communication between information vending machines and is directly connected to all information vending machines via communication line 21. The information center 11 transmits information as the object of sales to the main information vending machine 31a with the designated destination added thereto, and the main information vending machine 31a transfers the received information as the object of sales to the designated subordinate information vending machines (31b to 31n). The information storage portion 41 of each information vending machine stores the received information. In this case, the information center 11 transmits as destination data the correspondence list which specifies the correspondence of each information vending machine with the information as the object of sales which is stored therein to the main information vending machine 31a, and the main information vending machine 31a transfers the information to be sold which is transmitted thereafter from the information center 11 to the predetermined subordinate information vending machines 31b to 31n with reference to the correspondence list. The main information vending machine 31a also transfers the correspondence list together with the information to be sold to the subordinate information vending machines 31b to 31n, and the list storage portion 42 of each subordinate information vending machine stores the list. Since the information center 11 has only to transmit the correspondence list and the information as the object of sales to the main information vending machine 31a, it is easy to control and manage the transmission of information. In addition, only one transmission of the correspondence list for each group suffices. If the information center 11 is distant from a group, it is possible to hold down the communication expenses to a low price by transmitting information from the main information vending machine to the subordinate information vending machines rather than individually transmitting the information from the information center to each information vending machine.

It is also possible that the main information vending machine 91a of another group is connected to the main information vending machine 31a so as to be communicable. In this case, the information center 11 transmits the correspondence list and information as the object of sales destined for another group to the main information vending machine 31a, and the main information vending machine 31a transfers the correspondence list and the information as the object of sales to the main information vending machine 91a of the group. In this way, when the information center 11 is distant from the area where a group exists, it is possible to hold down the communication expenses to a low price by transferring information from the main information vending machine 31a of the preceding group to the group rather than transmitting the information to the group directly from the information center 11.

(b) First Embodiment

Entire Structure

Figure 2:
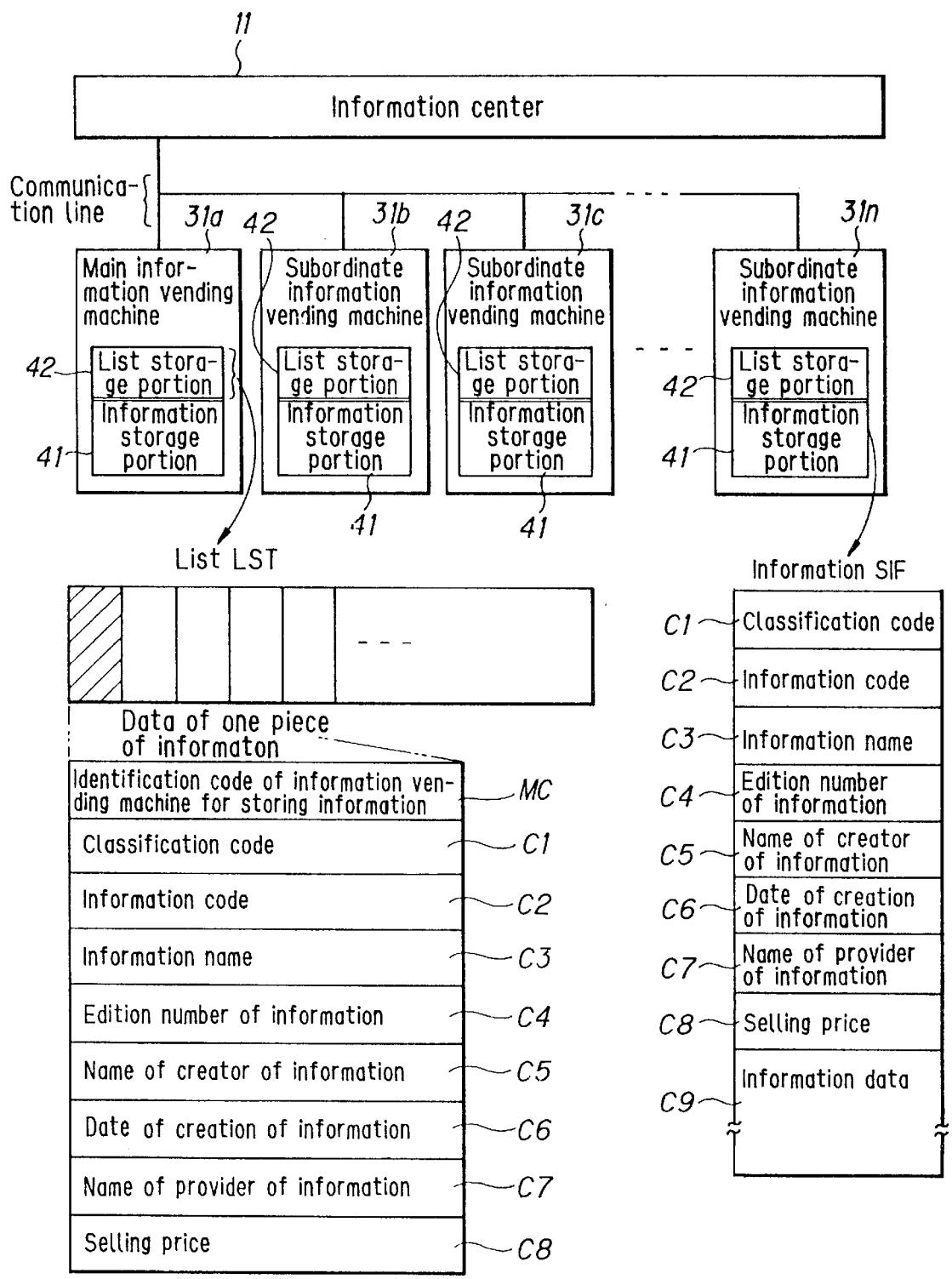
FIG. 2 shows the structure of a first embodiment of an information selling system according to the present invention.

FIG. 2 shows the structure of a first embodiment of an information selling system according to the present invention. The reference numeral 11 represents an information center for collecting various kinds of information, updating it and transmitting it to an information vending machine through a communication line as occasion demands, 21 a network such as a public network, a videotext network and an ISDN network, 31a to 31n information vending machines provided in predetermined places so as to sell the information requested by a purchaser by copying it on a recording medium such as a memory card and a floppy disk.

The information vending machines 31a to 31n constitute one group in which the information vending machine 31a is the main information vending machine (reference information vending machine), and the other information vending machines 31b to 31n are subordinate information vending machines. In this group, only the main information vending machine 31a communicates with the information center 11 through the communication line 21, and the various kinds of information, the list transmitted from the information center 11, etc. are transferred to the subordinate information vending machines 31b to 31n by way of the main information vending machine 31a. The information vending machines provided in a predetermined area such as one district and one city are collected into one group.

In each information vending machine, the reference numeral 41 represents an information storage portion for storing information to be sold and 42 a list storage portion for storing a list LST containing various data such as the correspondence of each information vending machine with the information as the object of sales which is stored therein. The information storage portion 41 can store various kinds of information.

Structure of Information and List

Each piece of information SIF as the object of sales consists of a classification code C1 such as a genre, an information code C2 as an information identifier, an information name C3, the edition number C4 of the information, the name C5 of the creator of the information, the date C6 of creation of the information, the name C7 of the provider of the information, a selling price C8 and the content C9 of the information (information data). The list LST contains many items of information data each of which consists of an identification code MC of the information vending machine for storing information, a classification code C1 such as a genre, an information code C2 as an information identifier, an information name C3, the edition number C4 of the information, the name C5 of the creator of the information, the date C6 of creation of the information, the name C7 of the provider of the information and a selling price C8.

Schematic Explanation of Operation

The information center 11 transmits the list LST to the main information vending machine 31a so that the list storage portion 42 stores it prior to the transmission of the information as the object of sales, and thereafter transmits the information SIF to be sold by the corresponding information vending machine to the main information vending machine 31a. The main information vending machine 31a temporarily stores the received information in the information storage portion 41, and finds the information vending machine in which the received information SIF is to be stored with reference to the list LST while using the information code C2 as a key word. Thereafter, the main information vending machine 31a transfers the received information SIF together with the list LST to the designated subordinate information vending machine. Alternatively, the list LST may be transmitted to all the subordinate information vending machines 31b to 31n.

When a purchaser requests information, the information vending machine (31a to 31n) operated judges whether or not the requested information is stored in the information memory portion 41 thereof, and if it holds the information, it sells the information by copying it on a recording medium. If the information vending machine does not hold the requested information, it finds other information vending machine in which the requested information is stored with reference to the list LST, receives the requested information from the other information vending machine through the communication line 21, and sells the information by copying it on a recording medium.

Operation Panel

Figure 3:
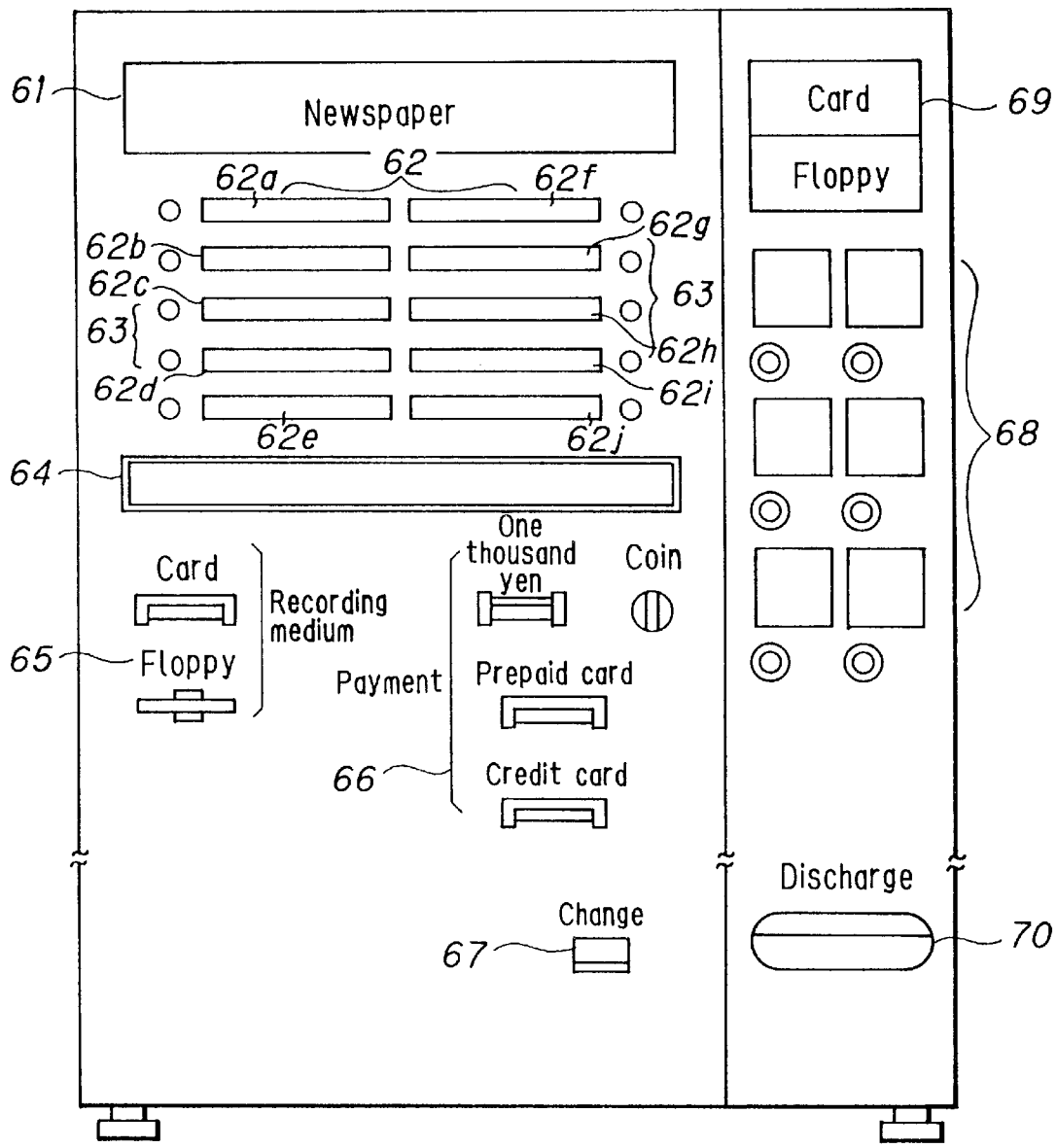
FIG. 3 shows an external appearance of the operation panel of an information vending machine of the embodiment shown in FIG. 2.

FIG. 3 is an external view of the operation panel of an information vending machine. The reference numeral 61 represents a display portion for displaying the kind of information to be sold such as a magazine and a newspaper, 62 an information display portion provided with a plurality of display windows 62a to 62j for displaying the information names (e.g., the names of newspapers, magazines, etc. to be sold), 63 an information selection switch provided in correspondence with each of the display windows 62a to 62j so as to specify the information, 64 a message display portion for displaying a message such as the procedure of operation and the price of the information, 65 an insertion slit for receiving a recording medium for storing information such as a memory card and a floppy disk, 66 a slot for receiving cash, a prepaid card, a credit card, etc., 67 a change discharge slot, 68 a new recording medium selecting portion for designating the type and the capacity of a recording medium to be sold, 69 a new recording medium type display portion for displaying the type of the new recording medium which has been bought, and 70 a recording medium discharge slit. A purchaser can specify the information which he requests by operating one of the information selection switches 63 which correspond to the display windows 62a to 62j. Thus, the purchaser can buy a desired number of pieces of desired information at one time. If the information to be sold has too wide a variety to be displayed in the display windows 62a to 62j, a scrolling button or a page turning button may be provided so as to display the entire information. Although the function of selling a new recording medium as well as the function of selling information such as a newspaper and a magazine is provided in the information vending machine shown in FIG. 3, the former function may be dispensed with.

Structure of Information Vending Machine

Figure 4:
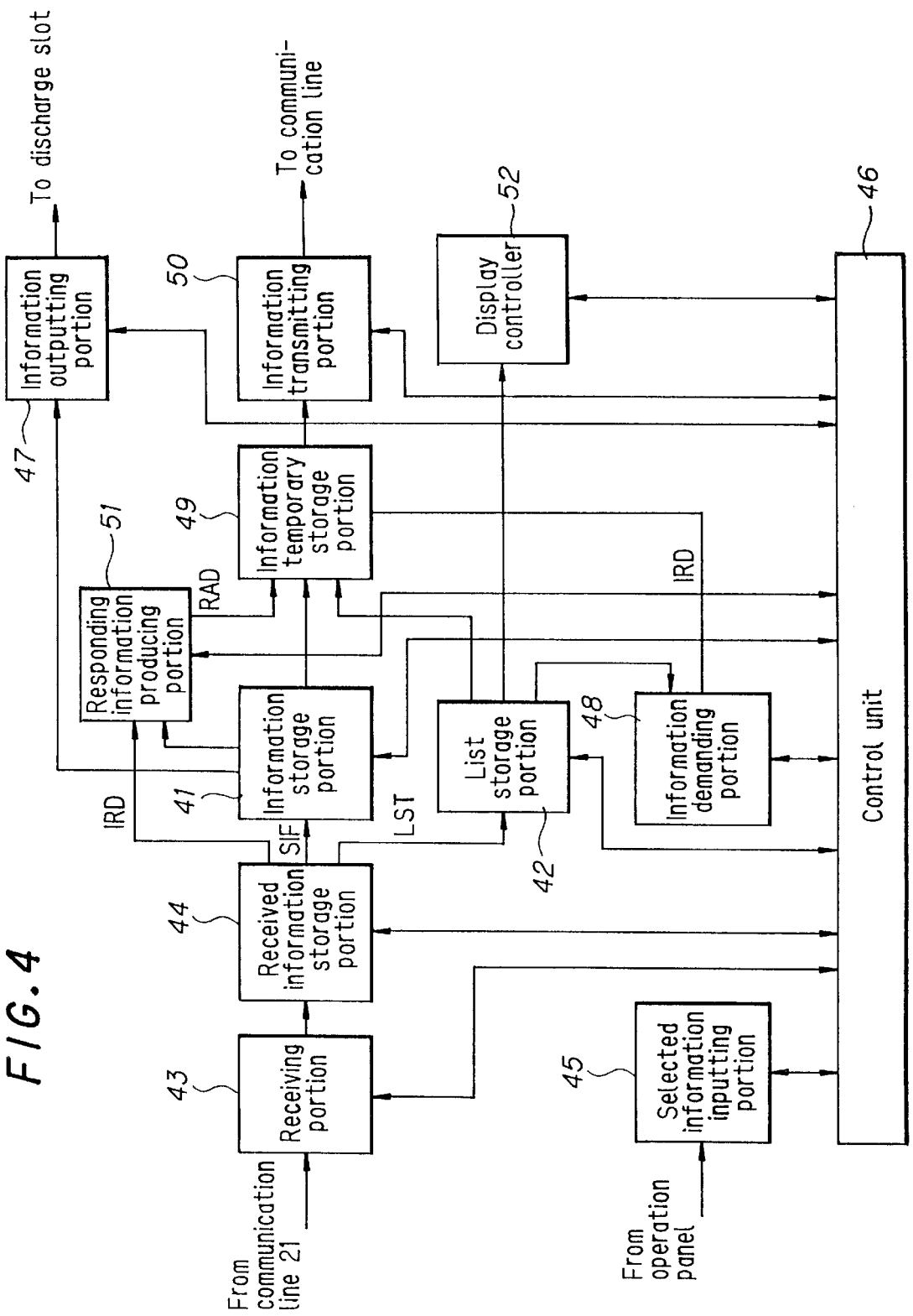
FIG. 4 is a circuit diagram of the information vending machine shown in FIG. 3.

FIG. 4 shows the circuit structure of each information vending machine. The information storage portion 41 stores the information SIF to be sold, and the list storage portion 42 stores the list LST. The reference numeral 43 denotes a receiving portion for receiving information, the list LST, etc. from the communication line 21, 44 a received information storage portion for temporarily storing the received information, 45 a selected information inputting portion for receiving and decoding the information data which is input by a purchaser through the operation panel, 46 a control unit for controlling the information vending machine as a whole and 47 an information outputting portion for copying the information requested by the purchaser on a recording medium and outputting it. The reference numeral 48 denotes an information demanding portion for producing information transfer requiring data IRD for demanding the information which is requested by a purchaser from another information vending machine when the information is not stored in the information storage portion 41, 49 an information temporary storage portion for temporarily storing the data which is to be transferred to another information vending machine, 50 an information transmitting portion for transferring the data stored in the information temporary storage portion 49 to the communication line 21, 51 a responding information producing portion for producing response data RAD when it receives the information transfer requiring data IRD from another information vending machine, and 52 a display controller for displaying an information name, a message, etc. on each display portion of the operation panel.

Figure 5:
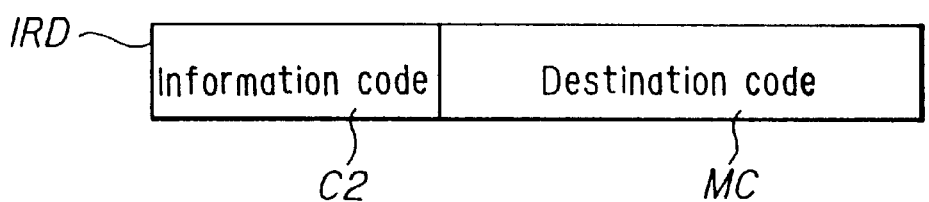
FIG. 5 shows the structure of information transfer requiring data.

When the information which is requested by a purchaser is not stored in the information storage portion 41, the information demanding portion 48 produces the information transfer requiring data IRD having the information code C2 of the requested information and the code MC of the information vending machine to which the information demanding portion 48 belongs, that is, a destination code (see FIG. 5) and supplies the information transfer requiring data IRD to the information temporary storage portion 49.

Figure 6:
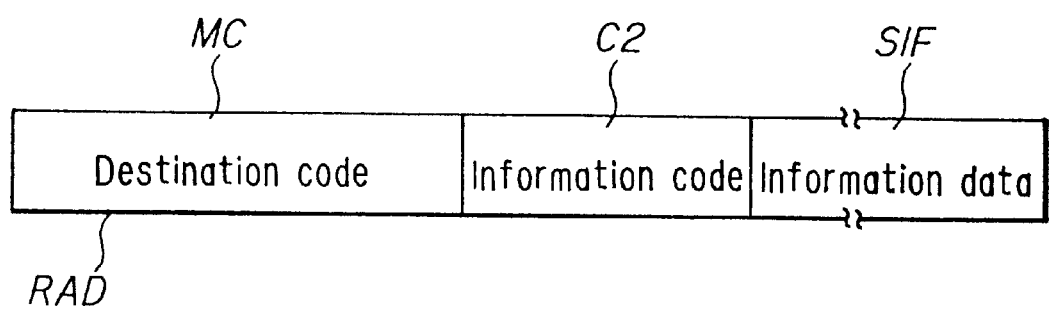
FIG. 6 shows the structure of response data.

When the responding information producing portion 51 receives the information transfer requiring data IRD from another information vending machine, it reads the information SIF indicated by the information code C2 which is included in the data IRD from the information storage portion 41, attaches the destination code MC and the information code C2 to the head of the information SIF so as to produce the response data RAD (see FIG. 6) and supplies the data RAD to the information temporary storage portion 49.

The control unit 46 executes the following controlling operations (1) to (7).

(1) If the data stored in the received information storage portion 44 is identified to be the list LST by the control unit 46, it is stored in the list storage portion 42, while if the data is identified to be the information SIF to be sold, it is stored in the information storage portion 41.

(2) When information is requested by a purchaser, the control unit 46 judges whether or not the requested information is stored in the information storage portion 41, and if it is stored therein, the information outputting portion 47 copies the information on a recording medium and outputs it.

(3) If the requested information is not stored in the information storage portion 41, the control unit 46 searches the list LST so as to find other information vending machine which holds the information, whereby the information demanding portion 48 produces the information transfer requiring data IRD and the information transmitting portion 50 transmits the information transfer requiring data IRD to the other information vending machine.

(4) When the information transfer requiring data IRD is received from another information vending machine, the control unit 46 controls the responding information producing portion 51 so that it produces the response data RAD (see FIG. 6) and controls the information transmitting portion 50 so that it transfers the response data RAD to the information vending machine which requires the information.

(5) When the response data RAD is received from another information vending machine, the control unit 46 confirms the destination code MC included in the data RAD, stores the information SIF in the information storage portion 41 and controls the information outputting portion 47 so that it copies the information on a recording medium and outputs it.

(6) The control unit 46 further controls the display controller 52 so that the information name, a message, etc. are displayed on the display portions of the operation panel. For example, if the information which is not stored in the information vending machine is requested by a purchaser (because it used to be stored therein or for another reason), the control unit 46 informs the purchaser of the absence of the information by displaying a message on the display portion 64.

(7) The control unit 46 of the main information vending machine not only executes the controlling operations (1) to (6), but also transfers the information SIF which is received from the information center 11 through the communication line 21 together with the list LST to the subordinate information vending machines.

The control of the information vending machine as a whole will now be explained.

Figure 7:
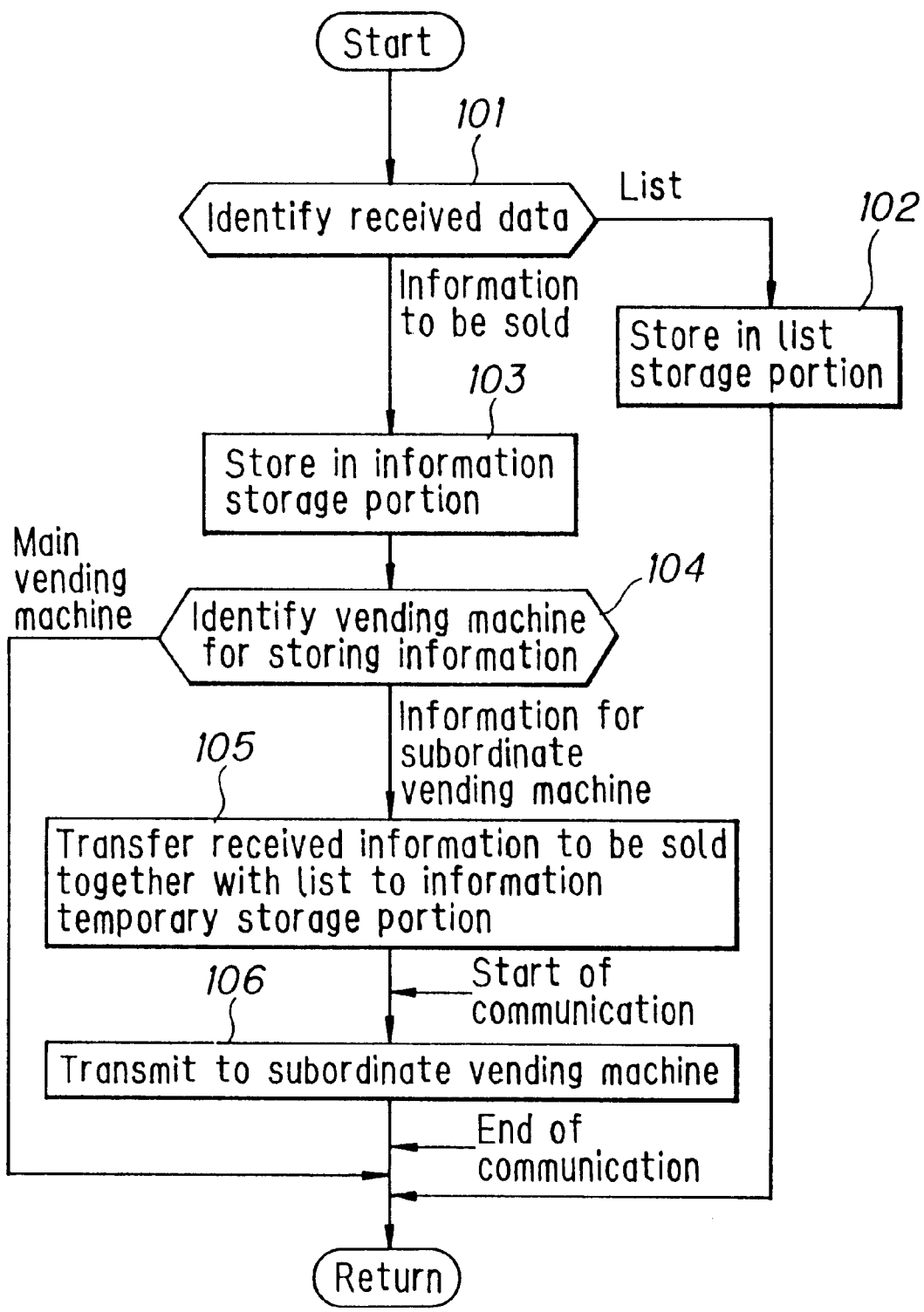
FIG. 7 is a flowchart of the information storage and the information transmission by the main information vending machine.

Information Storage and Information Transmission By Main Information Vending Machine FIG. 7 is a flowchart of the information storage and the information transmission by the main information vending machine.

When transmitting information to the information vending machines 31a to 31n, the information center 11 sequentially transmits the list LST and various kinds of information to the main information vending machine 31a, as shown in FIG. 2. With respect to the timing of transmission, a newspaper is transmitted at a fixed time every day, and a magazine is transmitted at a fixed time on the date of issue, for example, from the information center 11.

When the main information vending machine 31a receives data from the information center 11 through the communication line 21, the data is stored in the received information storage portion 44 (FIG. 4), and judgement is made as to whether or not the received data is the list LST or the information SIF to be sold (step 101). If the data is identified to be the list LST, the data is stored in the list storage portion 42 (step 102), and the main information vending machine 31a then waits for the next data.

On the other hand, if the received data is identified to be the information SIF to be sold, the data is stored in the information storage portion 41 (step 103). Thereafter, the main information vending machine 31a refers to the list LST while using the information code C2 included in the information SIF to be sold as a key word, and finds the code MC of the information vending machine which is to store the information SIF. Judgement is then made as to whether or not the code MC is the code of one of the subordinate information vending machines 31b to 31n (step 104).

If the answer is YES, in other words, if the information vending machine which is to store the received information SIF is one of the subordinate information vending machines 31b to 31n, the information SIF together with the list LST is input to the information temporary storage portion 49 (step 105).

The information transmitting portion 50 is then controlled so as to start communication, and the information SIF and the list LST stored in the information temporary storage portion 49 are transmitted to a predetermined subordinate information vending machine (step 106). When the information transmission is completed, the communication is finished, and the main information vending machine 31a waits for the next data. The above-described processing is repeated, and the transmission of the information as the object of sales to the subordinate information vending machines 31b to 31n is completed.

When the transmission of the information to the subordinate information vending machines 31b to 31n is completed, the information center 11 lastly transmits the information for the main information vending machine 31a, and the main information vending machine 31a stores the information in the information storage portion 41 thereof (step 103), thereby ending the information storage and the information transmission.

Information Storage By Subordinate Information Vending Machine

Figure 8:
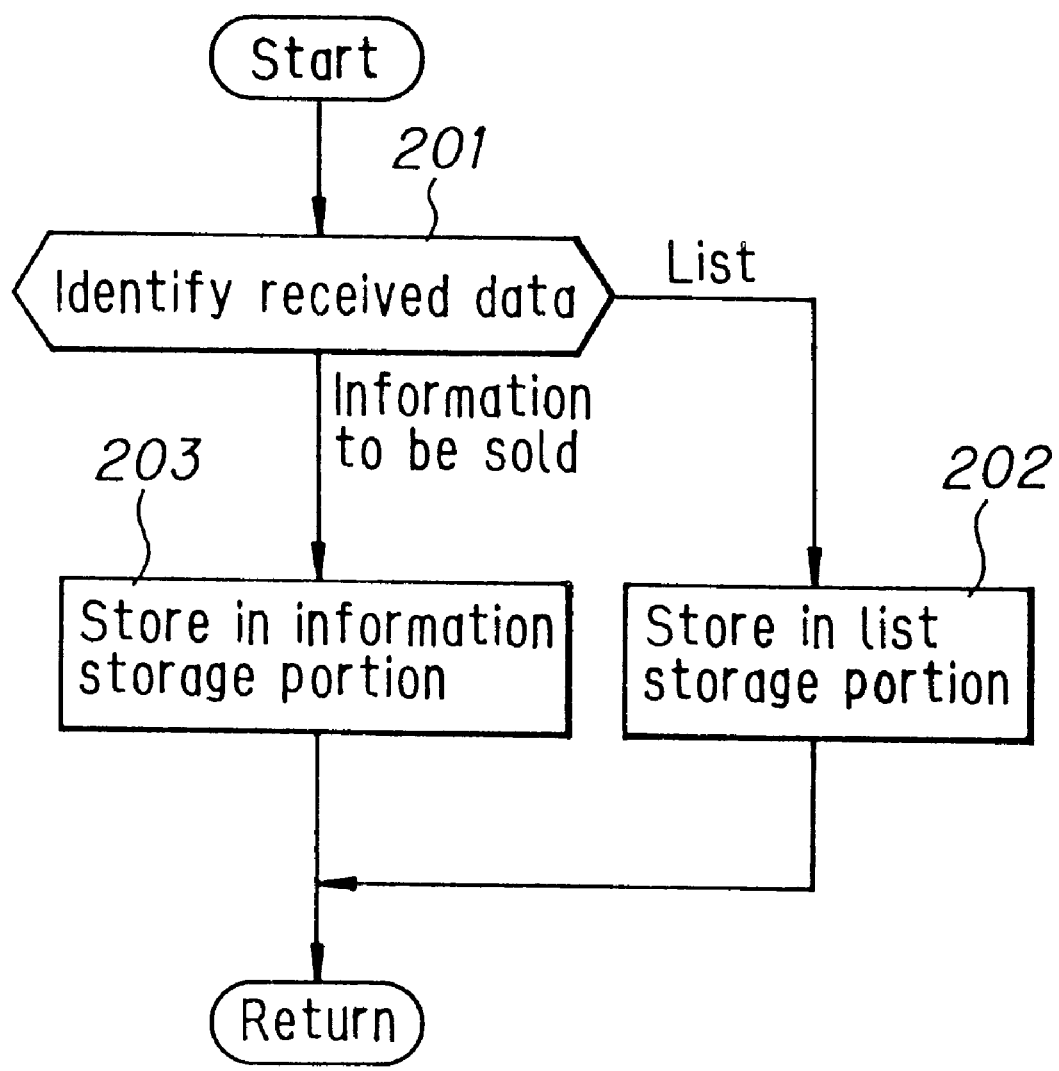
FIG. 8 is a flowchart of the information storage by a subordinate information vending machine.

FIG. 8 is a flowchart of the information storage by a subordinate information vending machine.

When each of the subordinate information vending machines (31b to 31n) receives data from the main information vending machine 31a through the communication line 21, the data ia stored in the received information storage portion 44, and judgment is made as to whether or not the data which is read from the received information storage portion 44 is the list LST or the information SIF to be sold (step 201). If the data is identified to be the list LST, the data is stored in the list storage portion 42 (step 202), and if the data is identified to be the information SIF to be sold, the data is stored in the information storage portion 41 (step 203). The subordinate information vending machine then waits for the next data.

Information and List Transmission By Information Center

Figure 9:
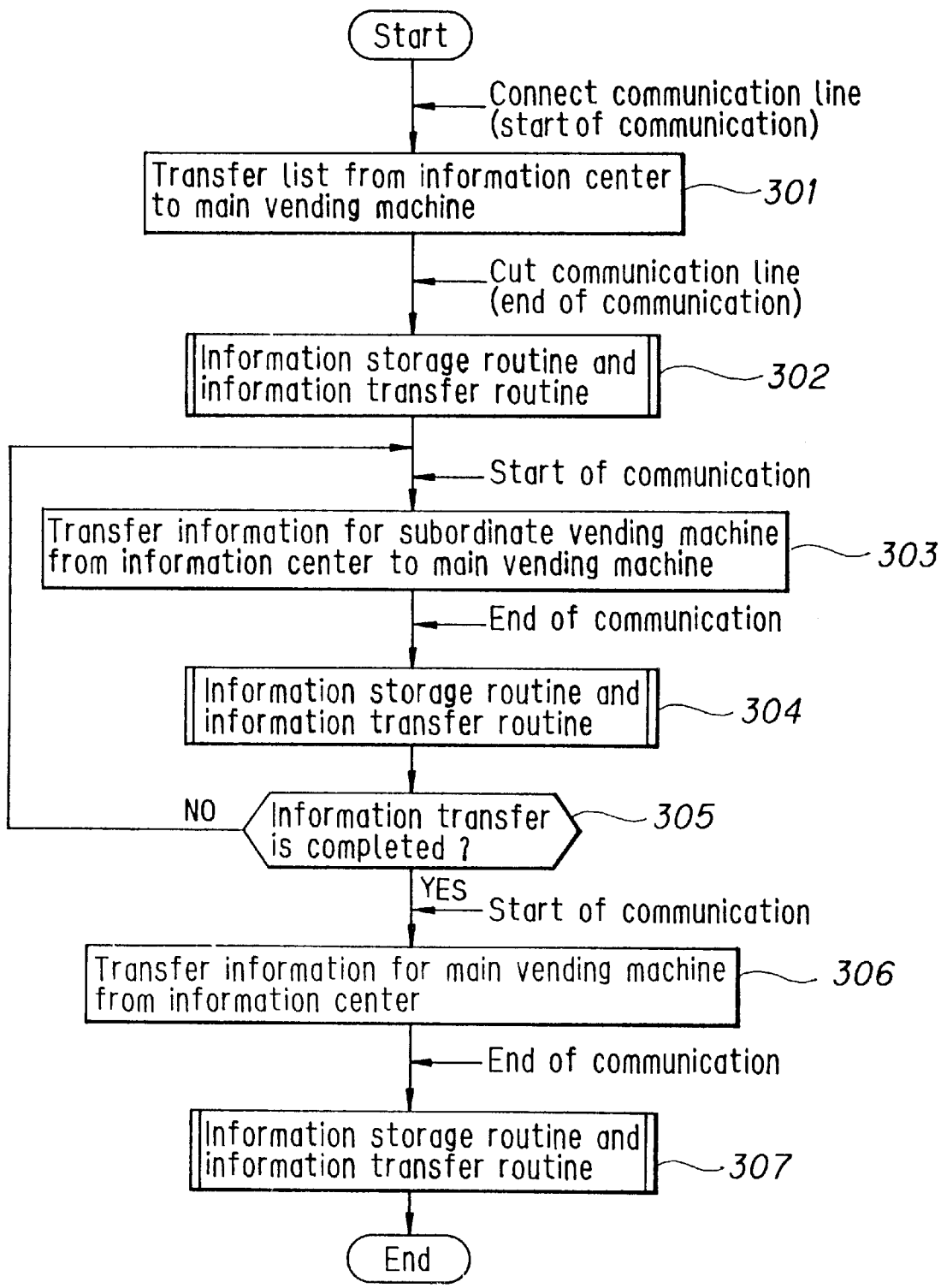
FIG. 9 is a flowchart of the information and list transmission from an information center.

FIG. 9 is a flowchart of the information and list transmission by the information center.

When transmitting information to the information vending machines 31a to 31n, the information center 11 connects the communication line with the main information vending machine 31a (start of communication), transmits the list LST (step 301) to the main information vending machine 31a, and cuts the communication line when the transmission is completed (end of communication).

The main information vending machine 31a executes the information storage routine and the information transfer routine, as shown in FIG. 7, thereby storing the list LST in the list storage portion 42 thereof (step 302).

At the end of the information transfer routine executed by the main information vending machine 31a, the information center 11 connects the communication line with the main information vending machine 31a (start of communication), transmits the information SIF to be sold by the subordinate information vending machines 31b to 31n (step 303) to the main information vending machine 31a, and cuts the communication line when the transmission is completed (end of communication).

The main information vending machine 31a executes the information storage routine and the information transfer routine, as shown in FIG. 7, thereby transferring the received information SIF together with the list LST to the predetermined subordinate information vending machine (31b to 31n), and the information SIF and the list LST are stored in the information storage portion 41 and the list storage portion 42 of the subordinate information vending machine, respectively (step 304).

The information center 11 judges whether or not the information which is to be transmitted to the subordinate information vending machines remains (step 305). If the information remains, the process returns to the step 303 so as to repeat the subsequent steps. On the other hand, if the information which is to be transmitted to the subordinate information vending machines does not remain, the communication line is connected with the main information vending machine 31a and thereafter the information center 11 transmits the information which is to be held by the main information vending machine 31a to the main information vending machine 31a. When the transmission is completed, the communication line is cut.

The main information vending machine 31a executes the information storage routine and the information transmission routine, as shown in FIG. 7, thereby storing the received information SIF in the information storage portion 41 (step 307). The information and list transmission by the information center is thus ended.

Information Selling Processing

Figure 10:
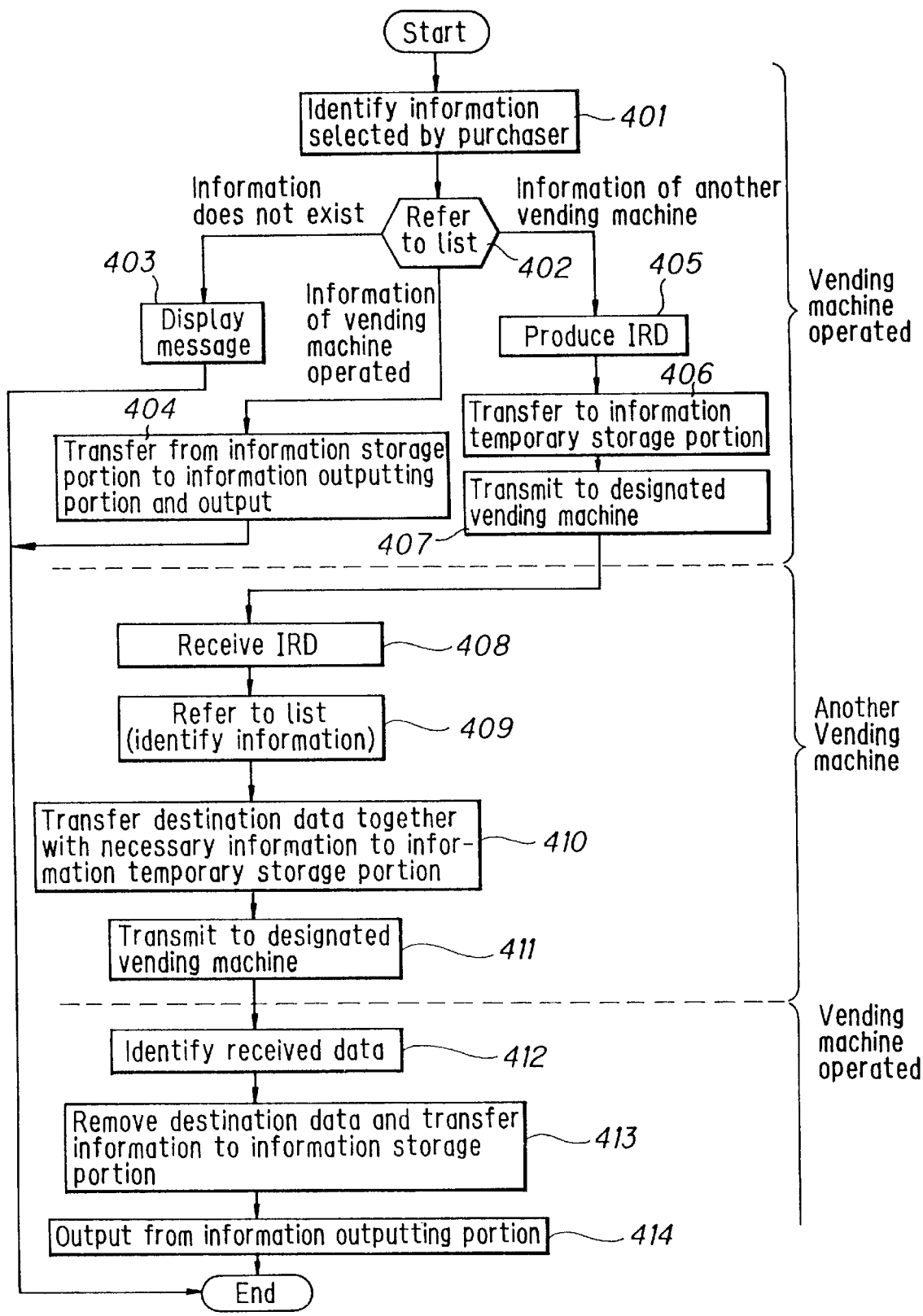
FIG. 10 is a flowchart of the information selling processing.

FIG. 10 is a flowchart of the information selling processing of each information vending machine.

When a purchaser specifies the information to be bought through the operation panel, the selected information inputting portion 45 (FIG. 4) produces an information code and inputs it to the control unit 46 (step 401). When the purchaser requests information, the control unit 46 refers to the information code which has been input and the list LST, and judges (1) whether or not the information having the information code is stored in one of the information vending machines, and (2) if the information exists, whether or not the information storage portion 41 of the information vending machine operated holds the requested information is judged (step 402).

If the requested information does not exist in any of the information vending machines, the display controller 52 informs the purchaser of the absence of the information by displaying a message on the display portion 64 of the operation panel (step 403). The information selling processing is thus finished.

When the information which is requested by the purchaser is stored in the information storage portion 41 of the information vending machine operated, the control unit 46 reads the information from the information storage portion 41, transfers it to the information outputting portion 47, and the information outputting portion 47 copies the information on a recording medium and outputs it (step 404). The information selling processing is thus finished.

On the other hand, when the information which is requested by a purchaser is not stored in the information storage portion 41 of the information vending machine operated, the control unit 46 finds other information vending machine which stores the information, and instructs the information demanding portion 48 to produce the information transfer requiring data IRD. In accordance with the instruction, the information demanding portion 48 produces the information transfer requiring data IRD shown in FIG. 5 (step 405).

The information demanding portion 48 supplies the information transfer requiring data IRD to the information temporary storage portion 49 (step 406), and the control unit 46 controls the information transmitting portion 50 so that the information transfer requiring data IRD is transferred to the other information vending machine (step 407).

The other information vending machine which has received the information transfer requiring data IRD (step 408) refers to the information code included in the information transfer requiring data IRD and the list LST (step 409), and instructs the responding information producing portion 51 to produce response data. In accordance with the instruction, the responding information producing portion 51 produce s the response data RAD shown in FIG. 6 and supplies it to the information temporary storage portion 49 (step 410). The control unit 46 controls the information transmitting portion 50 so that the response data RAD is transferred to the information vending machine which requires the transfer of the information (step 411).

When the information vending machine which has transmitted the information transfer requiring data IRD receives the response data RAD from the information vending machine having the required information, the former confirms a destination code MC (step 412) and stores the information SIF included in the response data RAD in the information storage portion 41 (step 413). Thereafter, the control unit 46 controls the information outputting portion 47 so that the information is copied on a recording medium and output (step 414). The information selling processing is thus finished.

Processing for Writing Information Into Recording Medium

Figure 11:
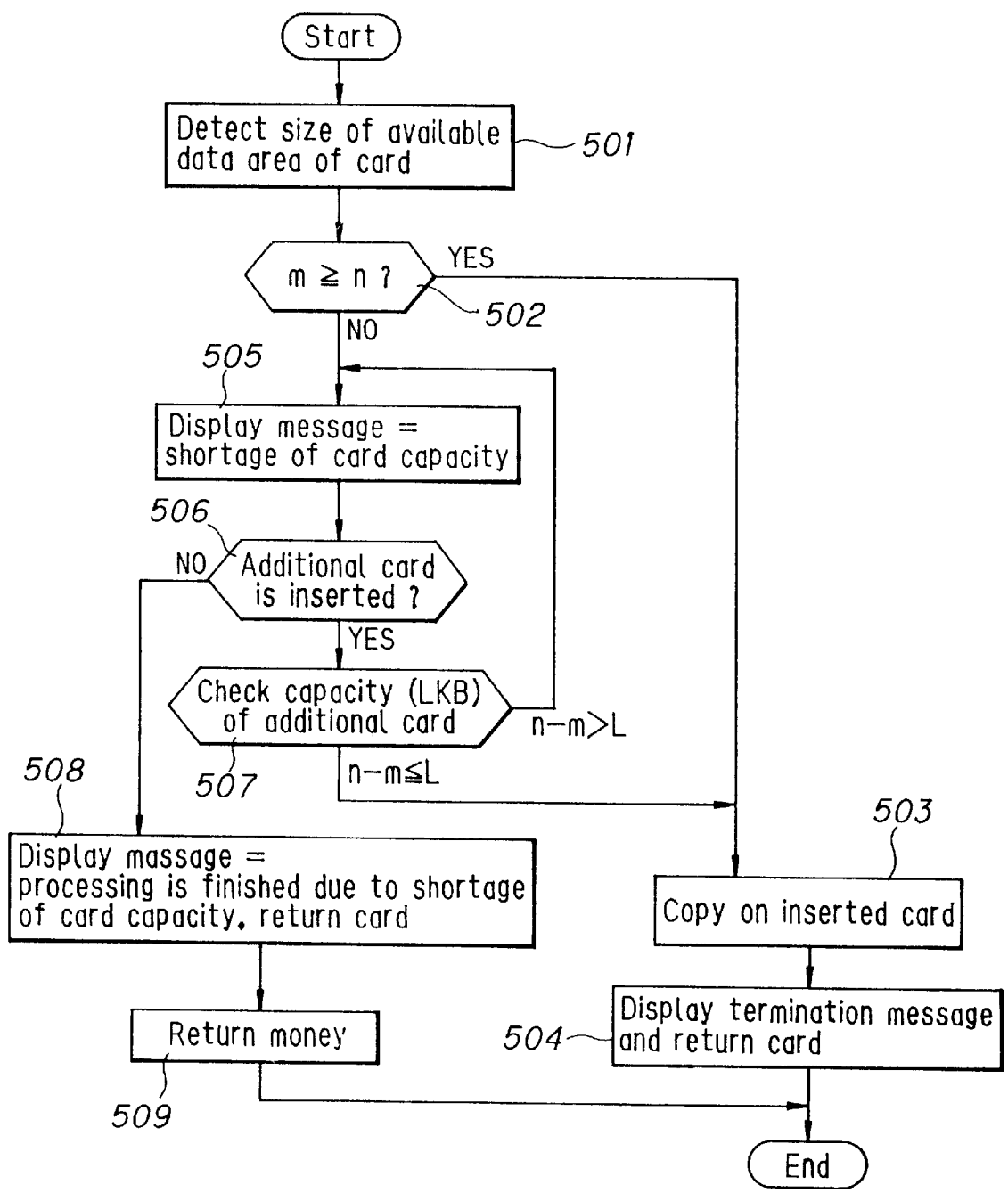
FIG. 11 is a flowchart of the processing for writing information into a recording medium.

FIG. 11 is a flowchart of the processing for writing information into a recording medium. When writing information into a recording medium, the information outputting portion 47 detects the size m of the available data area of the recording medium (step 501), and then compares the size m with the size n (KB) of the information requested by the purchaser (step 502). The size n is easily detected by including it in the information or the list. When m≧n, the information is copied on the recording medium which has been inserted (step 503). The display portion 64 then displays a termination message and the recording medium is returned to the purchaser (step 504).

On the other hand, when m<n, the control unit 46 informs the purchaser of a shortage of the capacity of the recording medium by displaying a message on the display portion 64 (step 505) and detects whether or not an additional recording medium is inserted (step 506). When it is detected that an additional recording medium is inserted, the capacity L (KB) of the additional recording medium is checked and compared with the shortage (n−m) of the capacity (step 507).

If n−m>L, the process returns to the step 505. If n−m≦L, the process at the step 503 is executed so as to copy the information on the two recording media. The display portion 64 then displays a termination message and the recording media are returned to the purchaser.

If an additional recording medium is not inserted at the step 506, a message such as "Processing is finished due to a shortage of the capacity of the recording medium" is displayed on the display portion 64 after a predetermined period of time (step 508). Thereafter, the money is returned and the processing is finished (step 509).

(C) Second Embodiment

Concept of Second Embodiment

In the first embodiment, information is sold from one group of information vending machines. When not less than two groups of information vending machines are distant from the information center 11, it is possible to hold down the communication expenses to a low price by transmitting the information and the list to a first group in the same way as in the first embodiment and transferring the information and the list to a second group through the first group rather than transmitting them from the information center 11.

Figure 12:
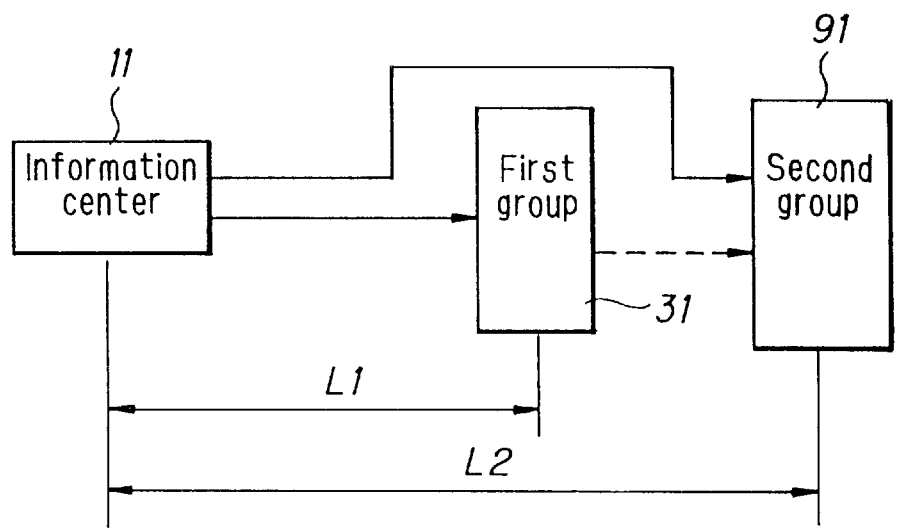
FIG. 12 is an explanatory view of a second embodiment of an information selling system according to the present invention which comprises plural groups of information vending machines.

FIG. 12 is an explanatory view of a second embodiment of an information selling system of the present invention which comprises plural groups of information vending machines. The reference numeral 31 represents a first group which is provided in an area (area A) distant L1 from the information center 11, and 91 a second group which is provided in an area (area B) farther (distant L2) from the information center 11.

In this case, the communication expenses are reduced by transmitting the information and the list to the first group 31 in the same way as in the first embodiment and transferring the information and the list to the second group 91 through the first group 31 rather than individually transmitting the information and the list from the information center 11 to the first group 31 and the second group 91 separately from each other in the same way as in the first embodiment.

Figure 13:
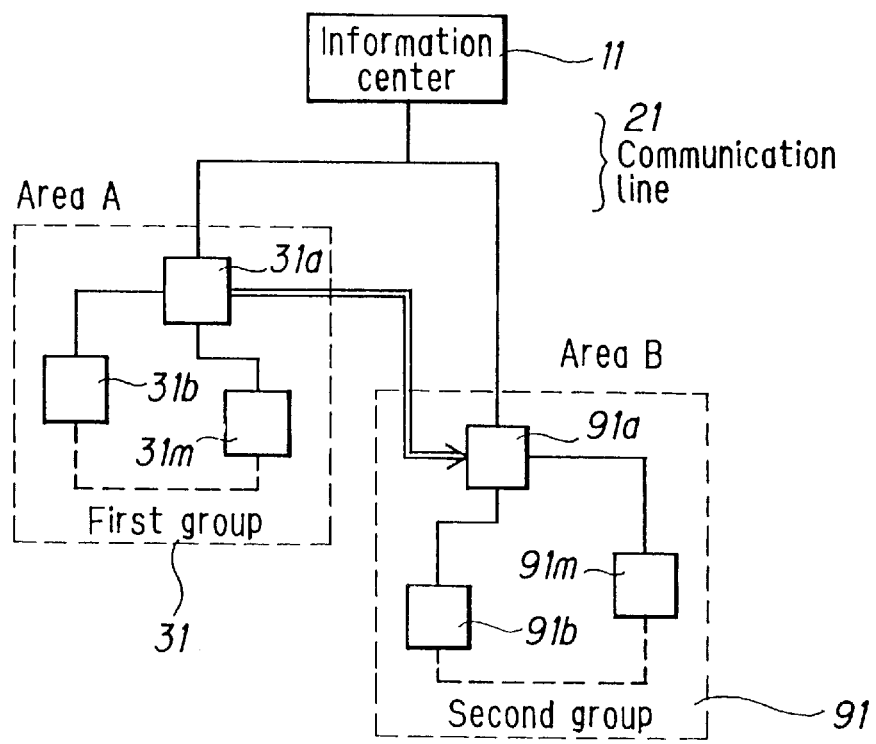
FIG. 13 explains the concept of the second embodiment.

For this reason, in the second embodiment, the main information vending machine 91a of the second group 91 is connected to the main information vending machine 31a of the first group 31 so as to be communicable, as shown in FIG. 13. The information center 11 transmits the correspondence list and the information as the object of sales destined for the second group 91 to the main information vending machine 31a of the first group 31, and the main information vending machine 31a transfers the correspondence list and the information as the object of sales to the main information vending machine 91a of the second group 91. The method of transmitting the list LST and the information SIF to be sold to each of the information vending machines 31a to 31b of the first group 31 is the same as in the first embodiment, and the method of transferring the list and information to subordinate information vending machines 91b to 91m through the main information vending machine 91a is also the same as in the first embodiment.

Structure of Second Embodiment

Figure 14:
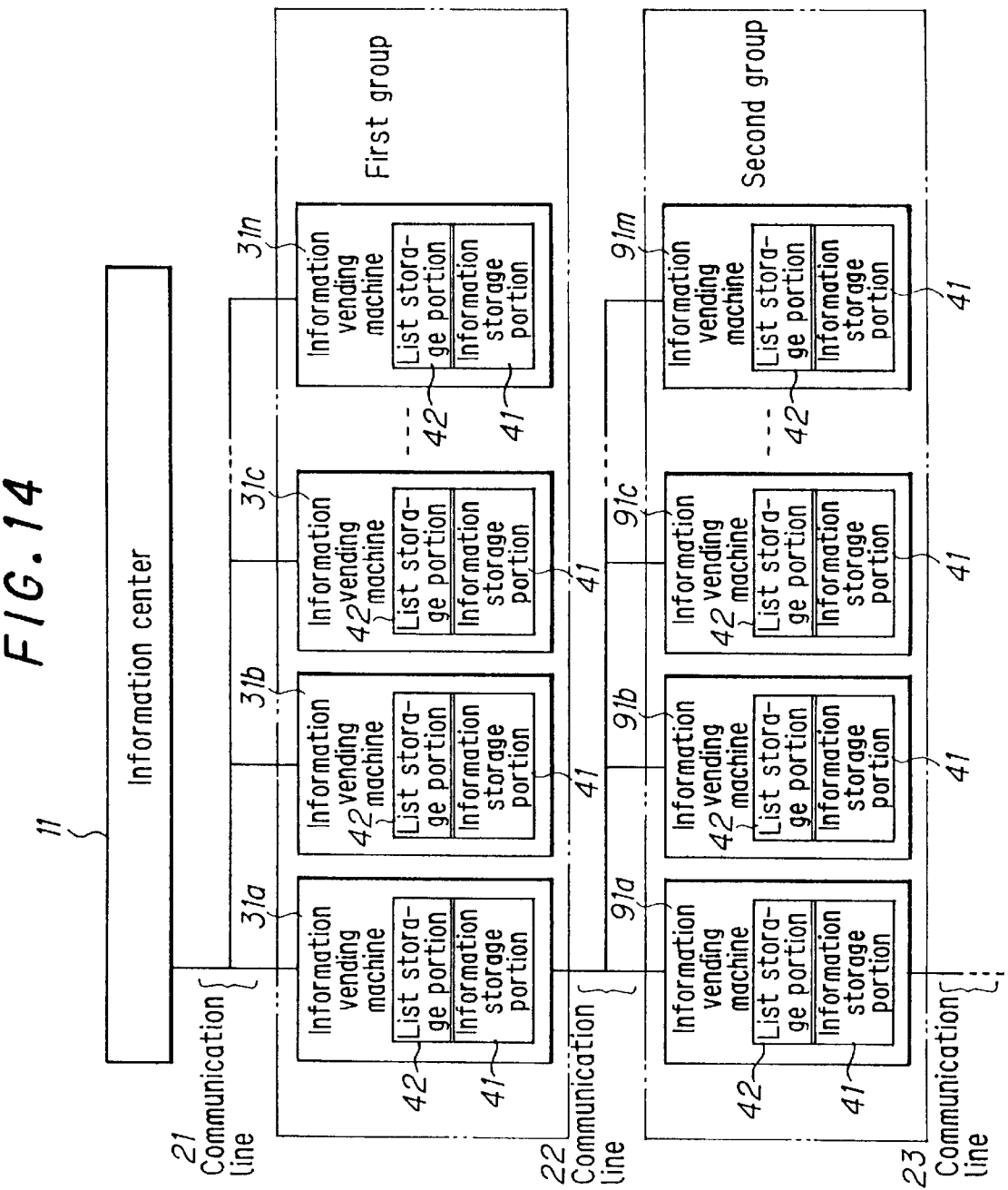
FIG. 14 shows the structure of the second embodiment.

FIG. 14 shows the structure of a second embodiment of an information selling system according to the present invention. The information center 11 collects and updates various kinds of information and transmits it to an information vending machine through a communication line as occasion demands. The reference numerals 21, 22, 23 . . . represent communication lines. The first group 31 consists of the main information vending machine 31a and the subordinate information vending machines 31b to 31n, and the second group 91 consists of the main information vending machine 91a and the subordinate information vending machines 91b to 91m. Each information vending machine has the same structure as that in the first embodiment (see FIGS. 3 and 4) including the information storage portion 41 for storing the information SIF to be sold and the list storage portion 42 for storing the list LST.

Processing of Main Information Vending Machine of First Group

Figure 15:
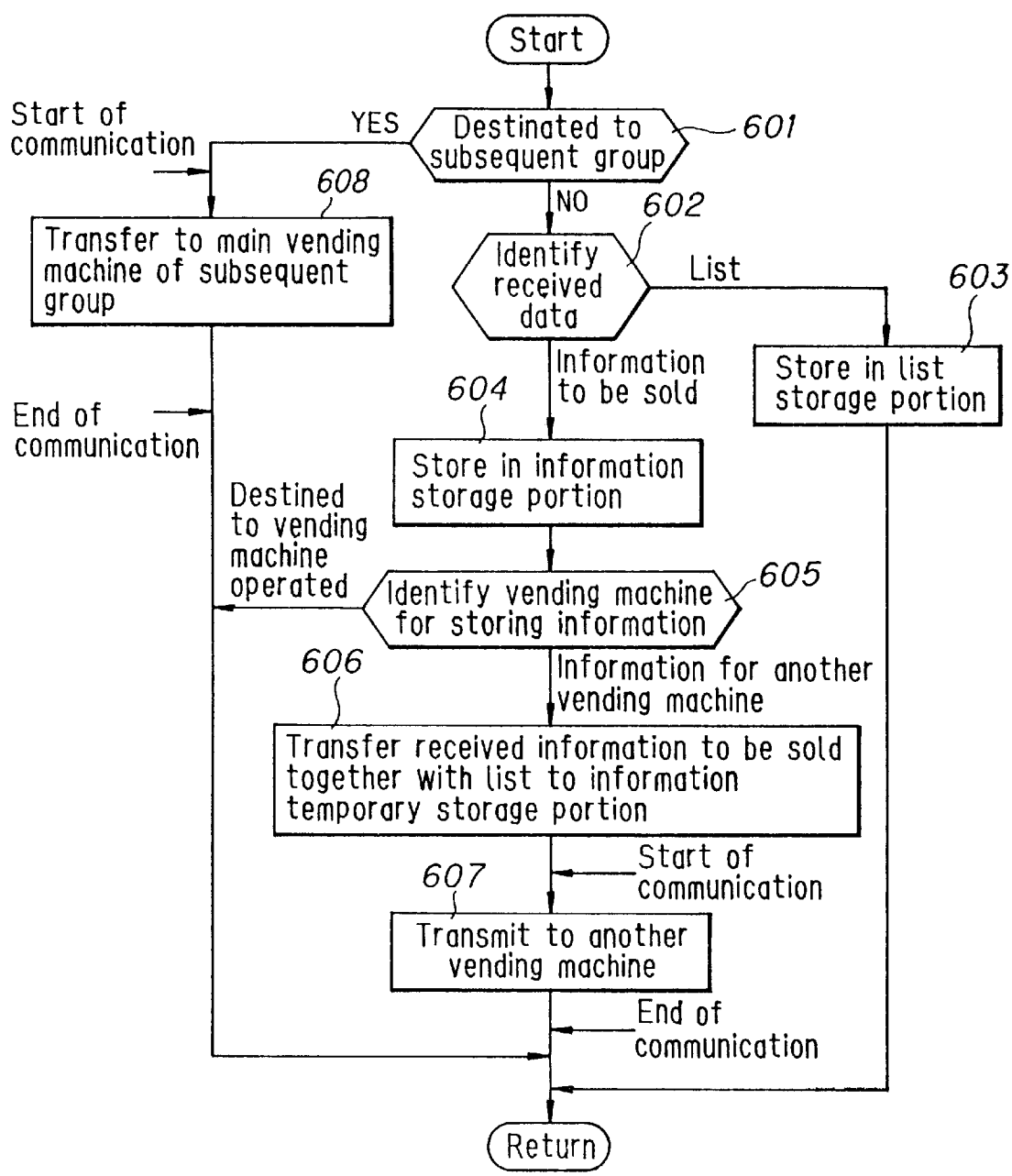
FIG. 15 is a flowchart of the information storage and the information transmission by the main information vending machine in the second embodiment.
Figure 16:
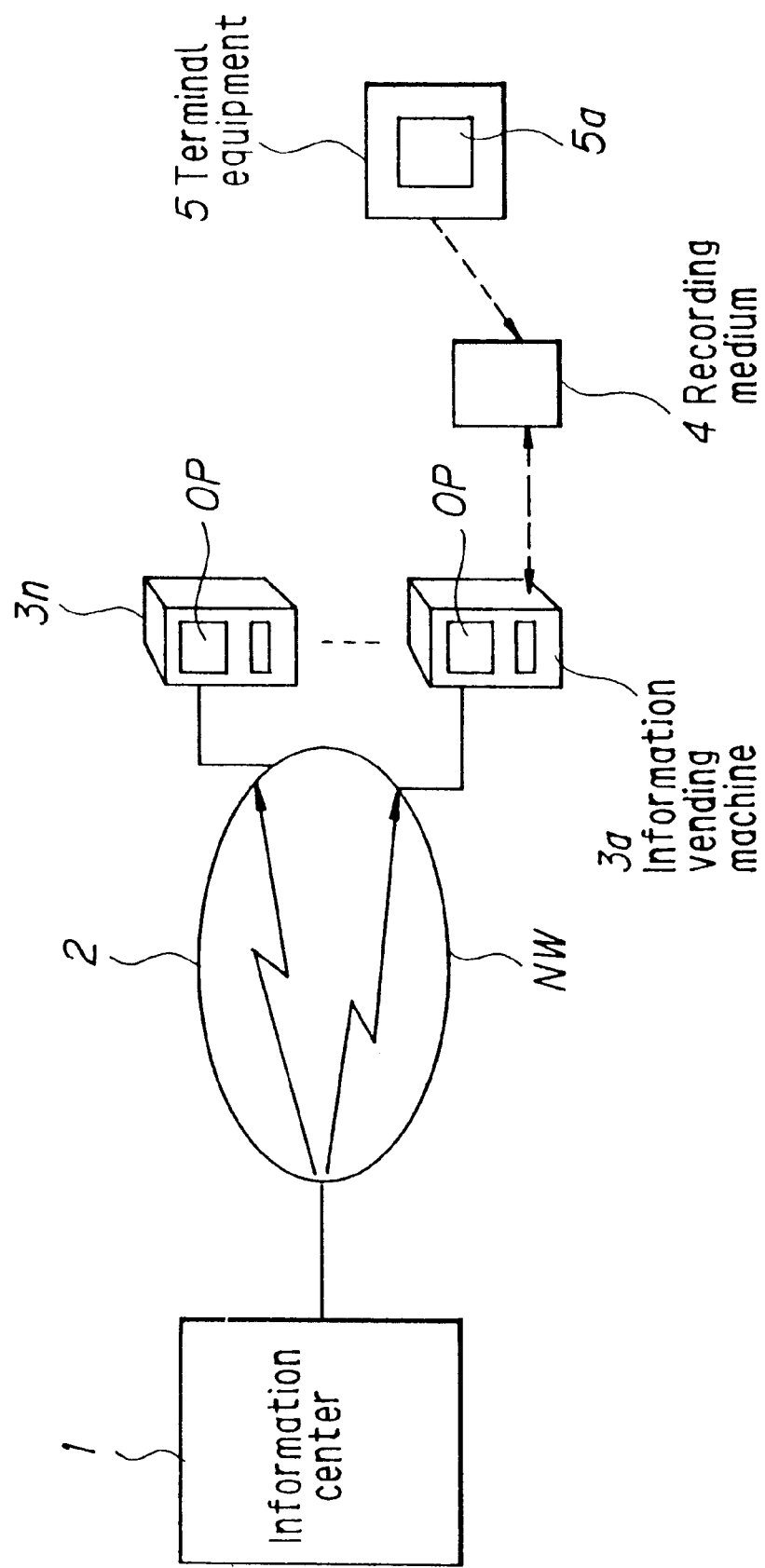
FIG. 16 is an explanatory view of an information selling system.
Figure 17:
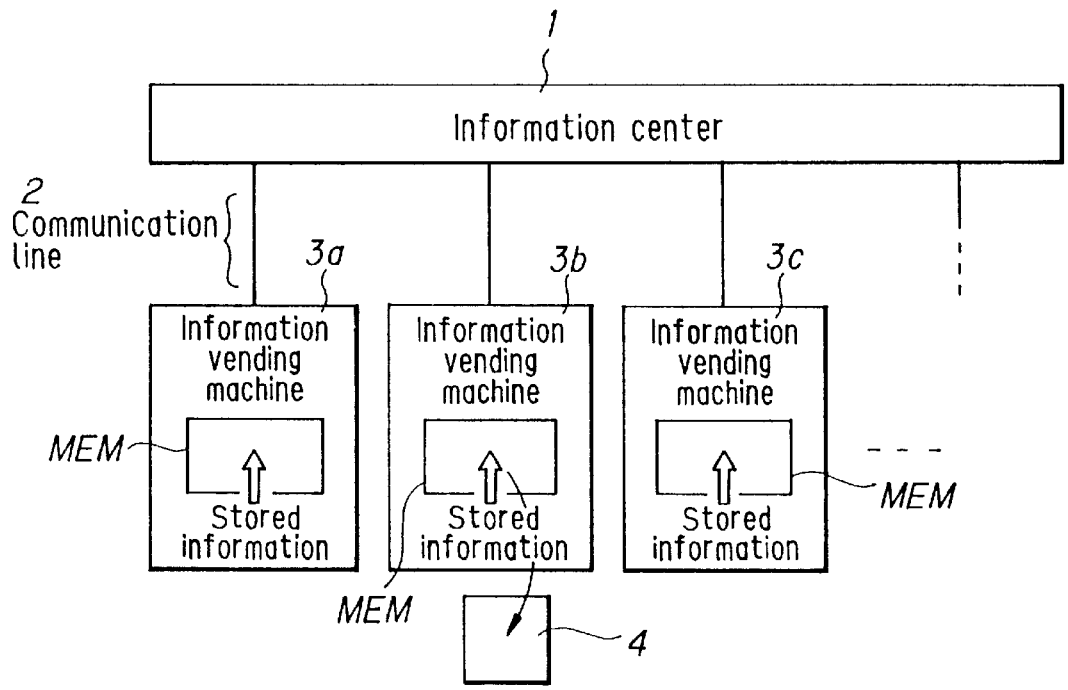
FIG. 17 is an explanatory view of a first example of a conventional information selling system.
Figure 18:
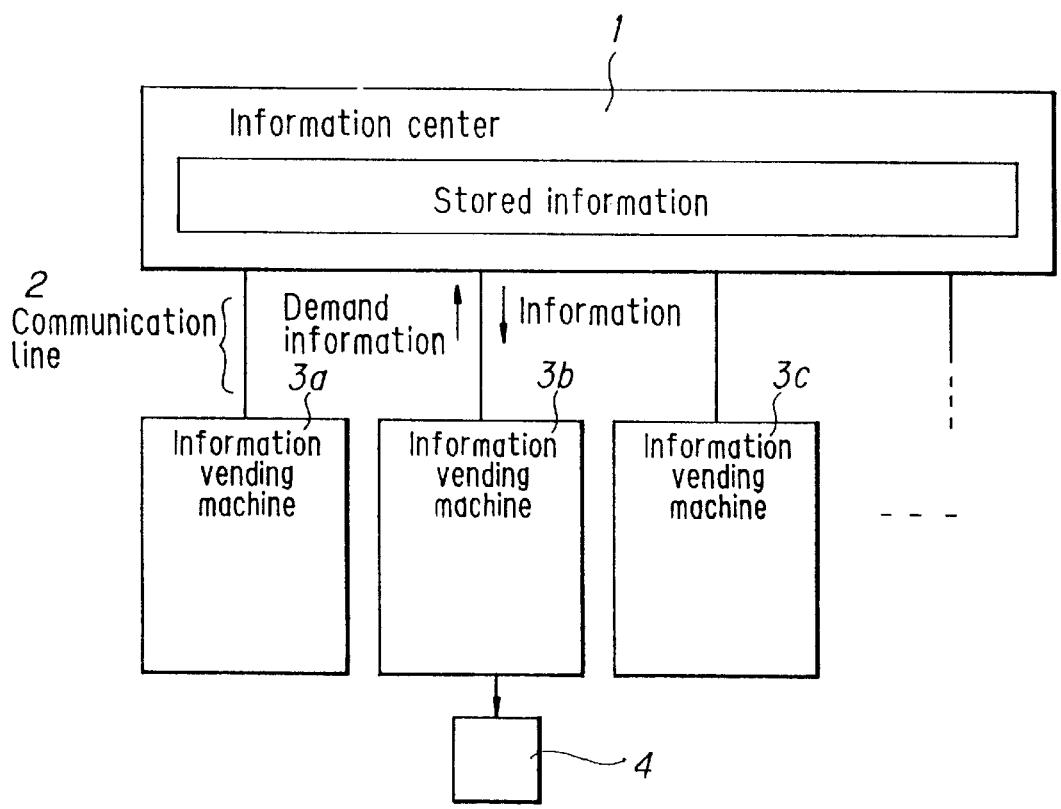
FIG. 18 is an explanatory view of a second example of a conventional information selling system.

FIG. 15 is a flowchart of the information storage and the information transmission by the main information vending machine 31a of the first group 31.

When the information center 11 is required to transmit information to the information vending machines 31a to 31n of the first group 31 and the information vending machines 91a to 91m of the second group 91, the information center sequentially transmits the list LST and the information for each group to the main information vending machine 31a.

When the main information vending machine 31a receives the data from the information center 11 through the communication line 21, it stores the data in the received information storage portion 44 and judges whether or not the data is destined for the second group 91 (step 601). The judgement is made with reference to the group identification code attached to the data.

If the data is destined for the first group 31, the same processing as that in the first embodiment is thereafter carried out. That is, judgement is made as to whether the received data is the list LST or the information SIF to be sold (step 602). If the data is the list LST, it is stored in the list storage portion 42 (step 603) and the main information vending machine 31a waits for the next data.

On the other hand, if the data is the information SIF to be sold, it is stored in the information storage portion 41 (step 604). The main information vending machine 31a obtains the code MC of the information vending machine which is to store the information SIF with reference to the list LST while using the information code C2 as the key word, and judges whether or not the code MC is the code of one of the subordinate information vending machines 31b to 31n (step 605).

If the answer is in the affirmative at step 605, in other words, if the information vending machine in which the received information SIF is to be stored is one of the information vending machines 31b to 31n, the information SIF is input to the information temporary storage portion 49 together with the list LST (step 606).

The information transmitting portion 50 then starts communication so as to transfer the information SIF and the list LST stored in the information temporary storage portion 49 to a predetermined subordinate information vending machine (31b to 31n) (step 607), and when the transfer is completed, the information transmitting portion 50 finishes the communication and waits for the next data. The process is repeated until the information SIF to be sold is transferred to all the subordinate information vending machines 31b to 31n.

When the transfer of the information SIF to the subordinate information vending machines 31b to 31n is finished, the information center 11 transmits the information SIF for the main information vending machine 31a to the main information vending machine 31a, and the main information vending machine 31a stores the information SIF in the information storage portion 41 (step 604), thereby ending the information storage and the information transfer in the first group 31.

If the received data is destined for the second group 91 at the step 601, the data is stored in the information temporary storage portion 49, and thereafter the information transmitting portion 50 starts communication so as to transfer the data (the list LST and the information SIF for the second group 91) stored in the information temporary storage portion 49 to the main information vending machine 91a of the second group so as to end the communication, and then waits for the next data (step 608). The same process is repeated, thereby ending the information storage and the information transfer in the second group 91.

The main information vending machine 91a of the second group executes completely the same processing in the first embodiment shown in FIG. 7 so as to transfer the information SIF and the list LST to the subordinate information vending machines 91b to 91m.

The processing for transmitting the information SIF and the list LST from the information center 11 is the same as in the first embodiment except that they are transmitted to the second group in addition to the first group, and the information selling processing in each group is completely the same as in the first embodiment.

Modification

In the above-described embodiments, the information to be sold and the list are transmitted from the information center to each subordinate information vending machine through the main information vending machine. However, if the rise in the communication expenses does not produce a serious problem, it is also possible to individually transmit the information to be sold and the list from the information center to each information vending machine.

It is also possible to transmit the information to be sold with the destination attached thereto without transmitting the list. In this case, the main information vending machine transfers the information to a subordinate information vending machine in correspondence with the destination, produces the list by using the destination data and transmits the list to each subordinate information vending machine.

As described above, according to the present invention, when the information requested by a purchaser is not held in the information vending machine operated, it is received from another information vending machine and sold to the purchaser. It is therefore possible to increase the number of kinds of information which is sold by each information vending machine without increasing the capacity of the storage unit of each information vending machine, which results in the increase in the sales.

In addition, according to the present invention, since each information vending machine stores a different kind of information, it is only the information vending machine which stores out-of-date information that is required to replace the information, which leads to the reduction of labor and time for the maintenance.

According to the present invention, since a storage unit having a small capacity suffices each information vending machine, it is possible to hold down the price of each information vending machine to a low price. Furthermore, since it is not necessary to communicate with the information center every time information is sold, it is possible to hold down the selling price of information to a low price.

According to the present invention, a plurality of information vending machines consist a group which is composed of the main information vending machine and subordinate information vending machines. The information center transmits data to the subordinate information vending machines through the main information vending machine. Since the information center has only to transmit the correspondence list and the information as the object of sales to the main information vending machine, it is easy to control and manage the transmission of information. In addition, only one transmission of the list for each group suffices. If the information center is distant from a group, it is possible to hold down the communication expenses to a low price by transmitting information from the main information vending machine to the subordinate information vending machines rather than individually transmitting the information from the information center to each information vending machine.

Furthermore, according to the present invention, the main information vending machine of one group is connected to the main information vending machine of another group so as to be communicable. The information center transmits the list and the information as the object of sales destined for the latter group to the main information vending machine of the former group, and the main information vending machine of the former group transfers the list and the information as the object of sales to the main information vending machine of the latter group. In this way, when the information center is distant from the area where a group exists, it is possible to hold down the communication expenses to a low price by transferring information from the main information vending machine of the preceding group to the group rather than transmitting the information to the group directly from the information center.

As many apparently widely different embodiments of the present invention can be made without departing from the spirit and scope thereof, it is to be understood that the invention is not limited to the specific embodiments thereof except as defined in the appended claims.

What is claimed is:

1. An information selling system for transmitting information to be sold comprising:

a plurality of information vending machines interconnected by communication lines, one of which is a main information vending machine and the others are subordinate information vending machines said main vending machine is privy to all communication of subordinate vending machines and is directly connected to all subordinate vending machines; and an information center for transmitting information including first information and second information to be sold to the main information vending machine, the first information is a correspondence list for specifying correspondence between second information and an information vending machine for storing said second information, wherein said main information vending machine including:

a receiving portion for receiving said first information and second information from the information center;

an identifying portion for identifying a subordinate information vending machine for storing the second information by referring to the correspondence list; and an information transmitting portion for transmitting the second information to said identified subordinate information vending machine and transmitting the correspondence list to all the subordinate information vending machines; and each of the subordinate information vending machines and the main information vending machine including:

a first storage means for storing second information;

a second storage means for storing said correspondence list;

an operating portion for specifying second information to be supplied to a purchaser;

a control portion, coupled to said first and second storage means, and to said operating portion, for searching said correspondence list stored in the second storage means to find another information vending machine which stores second information specified by said operating portion when said first storage means of the operated information vending machine does not store said specified information, and for requiring the another information vending machine to transfer said specified second information to said operated information vending machine; and an information outputting portion, coupled to and controlled by said control portion, for copying said information received from the another information vending machine on a recording medium.

2. An information selling system according to claim 1, and further comprising a first group of information vending machines and a second group of information vending machines in which the first group includes said main information vending machine and said subordinate information vending machines and the second group includes another main information vending machine and other subordinate information vending machines, wherein said main information vending machine of said first group is connected to the main information vending machine of said second group of information vending machines, said information center transmitting a correspondence list which specifies the correspondence of each information vending machine in said second group with the second information as the object of sales which is stored therein to said main information vending machine of said first group, and said main information vending machine of said first group transferring said correspondence list and said second information destined for said second group to said main information vending machine of said second group.

3. An information selling system according to claim 1, wherein said second information includes at least an information code as an information identifier, an information name, a selling price and information data, and said first information includes at least correspondence between an information code and an identification code of an information vending machine for storing and selling the second information specified by said information code.

4. An information selling method in an information selling system which includes a plurality of information vending machines and an information center for transmitting information to be sold to the plurality of information vending machines, comprising the steps of:

making one of the information vending machines be a main information vending machine and making the others be subordinate information vending machines;

interconnecting all the information vending machines by communication lines said main information vending machine is directly connected to each subordinate vending machine and privy to all communication between subordinate vending machines;

transmitting information including first information and at least one second information of a plurality of second information, said second information is available for sale by each information vending machine, from the information center to the main information vending machine, the first information being a correspondence list for specifying correspondence between said plurality of information vending machines;

receiving said first information and said transmitted at least one second information of said plurality of second information by the main information vending machine;

identifying at least one subordinate information vending machine for storing at least one second information of said plurality of second information received by the main vending machine by referring to the received correspondence list in the main information vending machine;

transmitting at least one second information of said plurality of second information received by the main information vending machine to said at least one identified subordinate information vending machine and transmitting the correspondence list from the main information vending machine to the identified at least one subordinate information vending machine;

receiving and storing at least one second information of said plurality of second information transmitted from the main information vending machine and said correspondence list in said at least one identified subordinate information vending machine; and selling at least one second information specified by a purchaser at at least one information vending machine.

5. An information selling method according to claim 4, further comprising steps of:

searching said correspondence list to find an information vending machine which stores second information specified by a purchaser when an information vending machine from which the purchaser intends to purchase the second information does not store said specified second information;

requiring the searched information vending machine to transfer said specified second information; and selling the specified second information from the information vending machine to the purchaser.

* * * * *

UNITED STATES PATENT AND TRADEMARK OFFICE
CERTIFICATE OF CORRECTION

PATENT NO. : 6,021,390
DATED : FEBRUARY 1, 2000
INVENTOR(S) : Kazuo SATOH, ET AL.

It is certified that error appears in the above-indentified patent and that said Letters Patent is hereby corrected as shown below:

On the title page, item[30], please insert
Foreign Application Priority Data,
Dec. 25, 1992 [JP] Japan....... 4-346940

Signed and Sealed this

Fourteenth Day of November, 2000

Attest:

Q. TODD DICKINSON

Attesting Officer      Director of Patents and Trademarks